Patented Apr. 21, 1925.

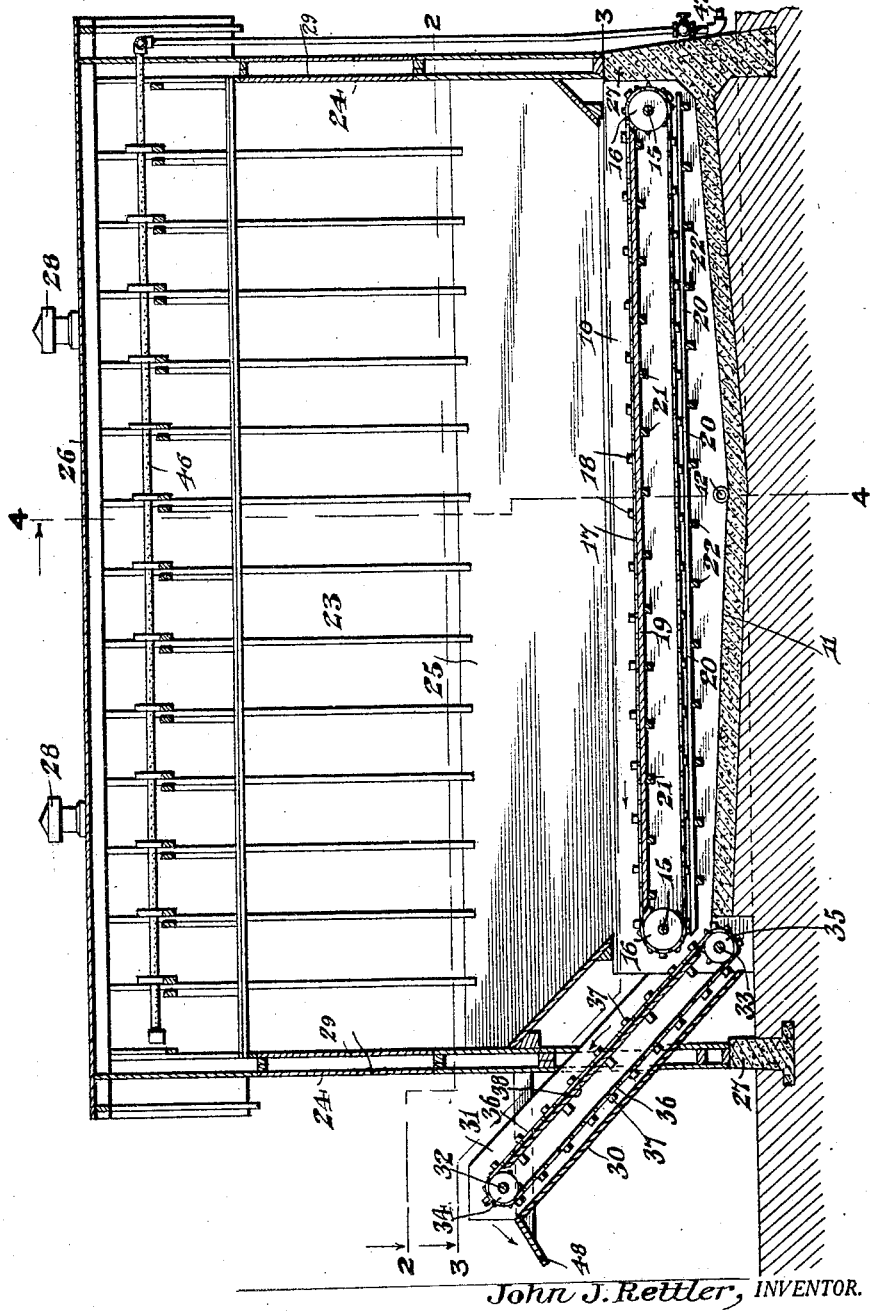

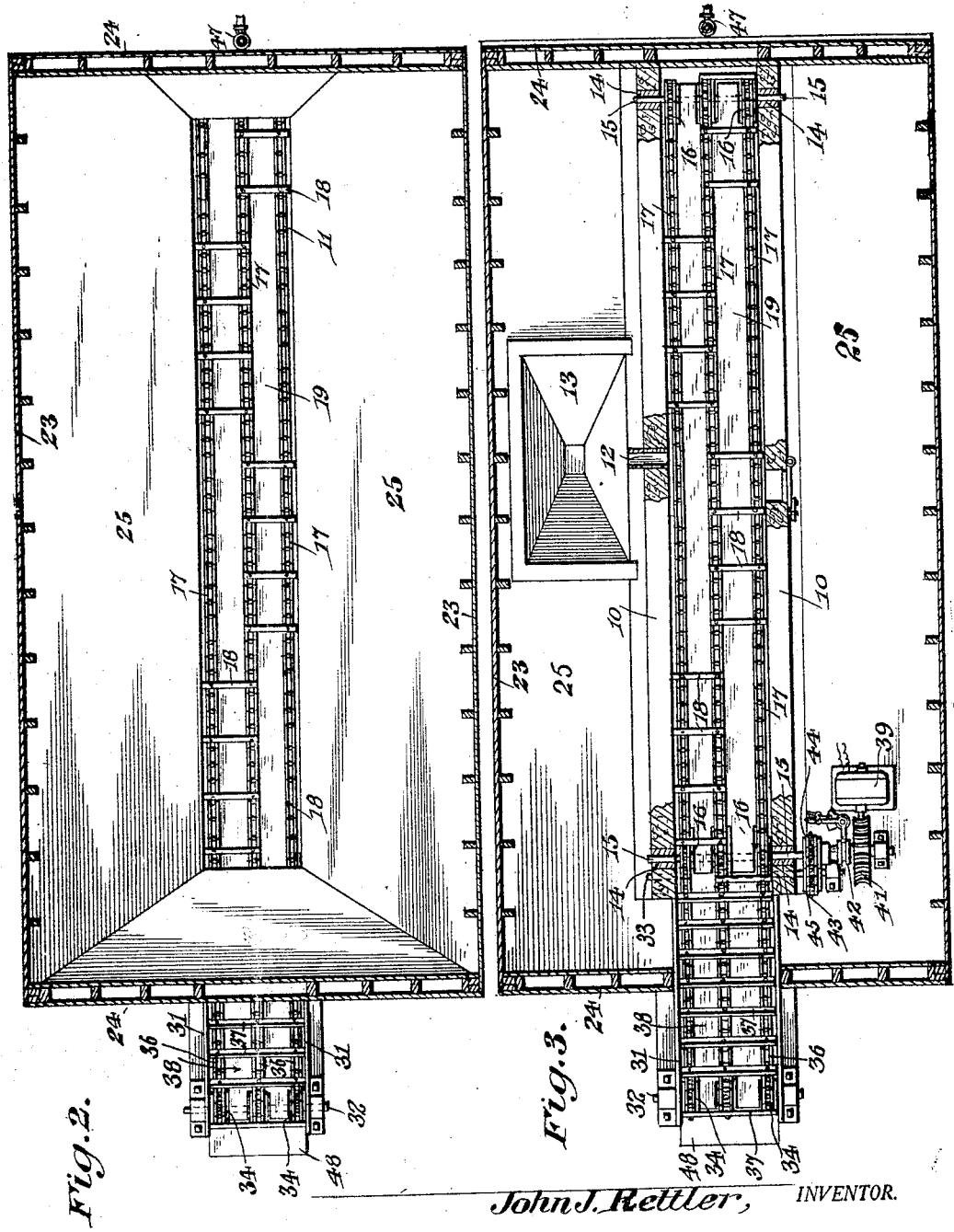

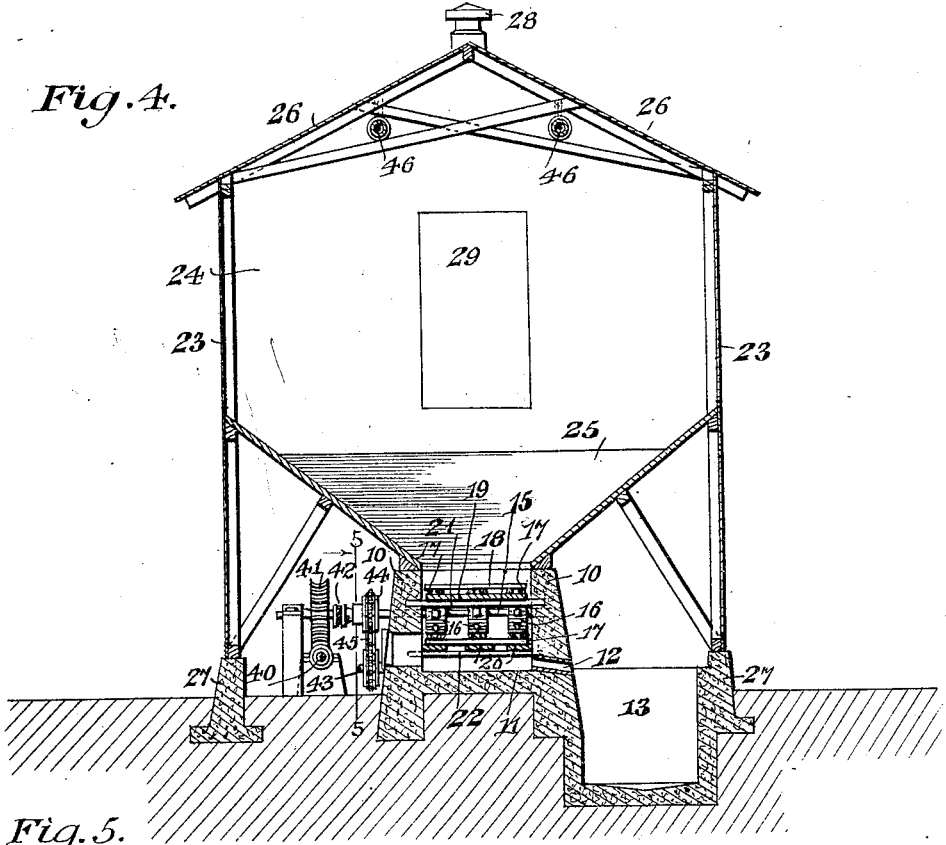
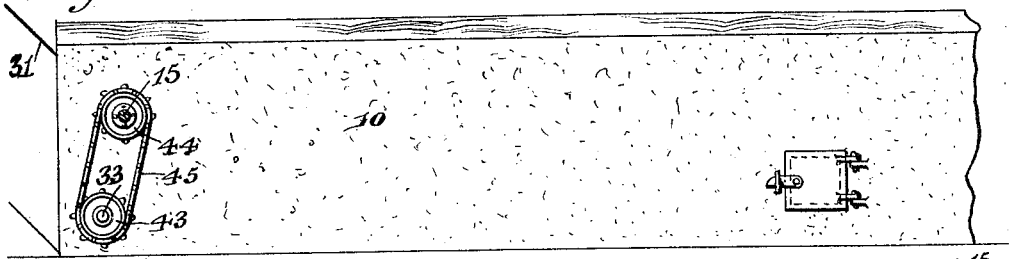
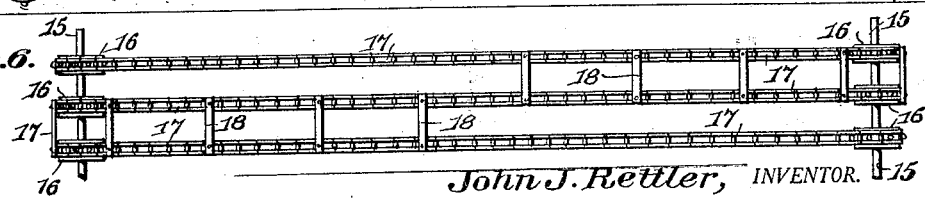

1,535,039

UNITED STATES PATENT OFFICE.

JOHN J. RETTLER, OF APPLETON, WISCONSIN.

COMPOST-STORAGE BIN.

Application filed January 24, 1924. Serial No. 688,253.

*To all whom it may concern:*

Be it known that I, JOHN J. RETTLER, a citizen of the United States, residing at Appleton, in the county of Outagamie and State of Wisconsin, have invented certain new and useful Improvements in Compost-Storage Bins, of which the following is a specification.

This invention relates to combined storage bins and discharging and loading apparatus for fertilizer and compost material, and has for one of its objects to improve the construction and increase the efficiency and utility of devices of this character.

Another object of the invention is to provide a device of this character, in which provision is made for saving and storing the liquid matter which drains from the non-liquid elements of fertilizer and compost material.

Another object of the invention is to provide a device of this character, in which provision is made for protecting the contents of the receiver or bin and subjecting the material to a sprinkling or moistening action.

Another object of the invention is to provide an apparatus of this character in which provision is made for reducing the strain on the discharging mechanism when first starting the apparatus.

With these and other objects in view the invention consists in certain novel features of construction as hereinafter shown and described and then specifically pointed out in the claims, and in the drawings illustrative of the preferred embodiment of the invention.

Figure 1 is a longitudinal sectional elevation.

Figure 2 is a plan view in section on the line 2—2 of Figure 1.

Figure 3 is a plan view in section on the line 3—3 of Figure 1.

Figure 4 is a transverse section on the line 4—4 of Figure 1, looking in the direction of the arrow.

Figure 5 is a side elevation of a portion of the apparatus with the drive shaft of the conveyors in section on the line 5—5 of Figure 4.

Figure 6 is a detail illustrating the construction of the horizontal conveyor arranged to reduce the strain when starting the movement.

The improved apparatus includes a supporting foundation of any suitable material, but for the purpose of illustration is shown of concrete or the like, and comprises a central portion having vertical sides 10 and a bottom 11, the latter sloping toward an intermediate point and with a lateral drainage tube 12 at the lowest point.

At one side of the central foundation a receiving tank 13 is formed of any suitable size or material, for instance of concrete as indicated, with its bottom sloping from all sides as indicated. The drainage pipe 12 communicates with the tank, so that all seepage from the trough like portion between the walls 10 will pass to the tank, as hereafter explained.

Mounted for rotation in bearings 14 embedded in the walls 10 near their ends, are transverse shafts 15 carrying chain wheels 16 to receive endless chains 17. Three sets of the chain wheels are shown mounted upon each shaft to provide for three of the chains, but a greater number may be employed, as required.

One of the side chains and the central chain have spaced series of slats 18 attached at their ends thereto, while the other side chain and the central chain have like series of spaced slats 18 attached at their ends thereto, the last mentioned series being disposed opposite the spaces between the first mentioned series, as shown.

By this arrangement the strains on the flights or slats are materially decreased especially when starting the movement of the belts, without materially decreasing the efficiency of the apparatus.

The longitudinal supports 20 being disposed in spaced relation effectually prevent the sagging of the chains, while at the same time permit the seepage to pass.

The storage bin or receptacle for the compost or fertilizer, comprises side walls 23, and end walls 24, and hopper bottom 25, the latter terminating upon the vertical walls 10, as shown.

The bin may be constructed of any suitable material, and any suitable construction, and will preferably be protected by a suitable roof, represented conventionally 26.

The vertical walls 23, 24 of the storage bin are shown supported on concrete posts 27.

Suitable ventilators, indicated at 28 may be installed in the roof 26, if found necessary, and a doorway through which the compost material is deposited in the storage bin is indicated at 29.

Extending from one end of the storage bin, is an inclined trough shaped structure comprising a bottom member 30 and vertical sides 31, the latter supporting transverse shafts 32 and 33 near the ends.

Mounted respectively on the shafts 32—33 are chain wheels 34—35 over which endless chains 36 operate, the chains having conveyor flights or slats 37. A supporting member 38 is located beneath the upper portions of the chains 36 to prevent sagging.

The lower shaft 33 is located below the line of the adjacent shaft 15, as shown in Figure 1, so that the material carried by the chains 17 and flights 18 will be discharged upon the inclined conveyor element.

The chain conveyors may be driven by any suitable power but for the purpose of illustration an electric motor is shown conventionally at 39 connected to one of the shafts 15, for instance by a worm pinion 40 on the motor shaft engaging a worm gear 41 on the adjacent shaft 15, with a clutch element 42 to control the motion. A chain wheel 43 is mounted on the shaft 33 and a like chain wheel 44 is mounted on the adjacent shaft 15, with an endless chain 45 operating over the chain wheels.

By this means the motion of the motor is imparted to both the horizontal and inclined slatted belts or conveyors.

Supported in any suitable manner above the contents of the storage bin, for instance the roof structure 26, are perforated conductor pipes 46, coupled to any suitable source of supply as shown at 47, and operative to moisten the contents of the bin, if required.

By this arrangement the compost material from stables or barns or from barnyards, may be deposited within the storage bin, and protected and preserved and any liquid seepage, which is generally the most valuable part of the compost, preserved in the tank 13 from which it may be removed by pumping, dipping or otherwise, for use as a valuable fertilizer.

At its upper end the trough shaped member 30—31 is provided with a slide board 48, and when a portion or all of the contents of the bin are required, the motor is started, and the clutch 42 gradually applied, to cause the conveyor belts to be gradually operated to feed the material over the slide board into a wagon, fertilizer distributor or the like.

By providing the clutch element 42, the power may be gradually applied and all danger of breakage of the chains obviated, as will be obvious.

The improved device is simple in construction, can be of any size or capacity, and any suitable material. The walls and hopper bottom of the bin may be of wood, metal, concrete, or any other suitable material, and may be constructed with or without the roof 26 as preferred.

By this arrangement the material can be daily gathered from barn yards, stables, and the like, and held in storage until required for distribution on the land. The material is thus protected from deterioration or waste and the stables and barn yards kept in sanitary condition, and all parts of the material preserved for use on the land.

The preferred embodiment of the invention is disclosed in the drawings and set forth in the specification, but it will be understood that changes and modifications within the scope of the claimed invention may be made in the construction without departing from the principle of the invention or sacrificing any of its advantages.

Having thus described the invention, what is claimed as new is:—

1. An apparatus of the class described, comprising a storage bin, a plurality of endless belts disposed in parallel relation and including an intermediate belt, and lateral belts spaced from opposite sides of the intermediate belt, a plurality of series of carrier slats attached to the intermediate belt and to one of the lateral belts, and a series of carrier slats attached to the intermediate belt and to the other of said lateral belts, the first mentioned series of slats being disposed opposite the spaces between the first and last mentioned series of slats.

2. An apparatus of the class described comprising a storage bin, endless carrier belts in the discharge of the bin and including side belts and an intermediate belt, a plurality of carrier slats arranged in series and connected respectively to one of the side belts and to the intermediate belt, and a plurality of carrier slats arranged in series and connected respectively to the intermediate carrier belt and to the other side belt, the last mentioned series of slats being disposed opposite the spaces between the first mentioned series of slats.

3. An apparatus of the class described comprising a storage bin, outer carrier belts and an intermediate carrier belt in the discharge of the bin, carrier slats attached to one of the outer belts and to the intermediate belt, carrier slats attached to the other of the outer belts and to the intermediate belt, the first mentioned slats being disposed opposite the spaces between the last mentioned slats.

In testimony whereof, I affix my signature hereto.

JOHN J. RETTLER.